3,767,707
SEPARATION OF DIAMINE ISOMERS
James W. Cleary, Bartlesville, Okla., assignor to
Phillips Petroleum Company
No Drawing. Filed Oct. 4, 1971, Ser. No. 186,457
Int. Cl. C07c 87/36
U.S. Cl. 260—563 R                28 Claims

ABSTRACT OF THE DISCLOSURE

A fractional crystallization method for separating a mixture of cis- and trans-diamines or an aqueous solution of diacid salts of cis- and trans-diamines into at least two fractions with at least one of said fractions having a higher content of trans-isomer. Separation is effected in an aqueous solution having a water to diacid salt ratio in the range of about 0.5 to about 10 by weight, causing a precipitate to form by lowering the temperature of the aqueous solution, and separating the precipitated fraction having the higher content of trans-isomer. The fraction which is in solution which has a higher content of the cis-isomer than the original can also be recovered and used in suitable applications.

---

It is often desirable to produce a diamine having a high content of trans-isomer. A fraction having a high content of trans-diamine is a valuable product which can be recovered for further processing or blended with cis-isomer in any desired proportions for producing polyamides for spinning into fibers having preselected characteristics. One method for producing a mixture of cis- and trans-diamines involves the hydrogenation of dinitriles, e.g., terephthalonitrile is converted to a product containing approximately equal molar quantities of cis-1,4-bis(aminomethyl)cyclohexane and trans-1,4-bis-(aminomethyl)cyclohexane.

The diacid salts of the above cis- and trans-diamines is then formed in water preferably by adding in a 1:1 molar mixture at least one diacid to the cis- and trans-diamine mixture. Suitable diacids are selected from the group consisting of linear alpha,omega-dicarboxylic acids having from 5-20 carbon atoms per molecule such as adipic, suberic, or 1,12-dodecanedioic acid. The water can thereafter be removed if a dry mixture of the salts is desired. Other ratios of diamines and diacids can be utilized for producing the diacid salts of cis- and trans-diamines but a 1:1 molar mixture of diamine and diacid is preferred since this is the ratio of diamine to diacid in the salt formed.

The diacid salts of cis- and trans-diamine which can be separated by the method of this invention are derived from cis- and trans-1,4-bis(aminoalkyl)cyclohexanes such as cis- and trans-1,4-bis(aminomethyl)cyclohexane, hereafter referred to as cis-(bAMCH) and trans-(bAMCH), cis- and trans-1,4-bis(aminoethyl)cyclohexane, hereafter referred to as cis-(bAECH) and trans-(bAECH), and the like.

It has been surprisingly found that the water solubility of the diacid salt enriched in the trans-diamine isomer is sufficiently different from the solubility of the diacid salt enriched in the corresponding cis-diamine that a separation can be made by filtering off a precipitated fraction having a higher content of trans-isomer diacid salt.

In an optional method of this invention, water is added to a solid mixture of diacid salts of cis- and trans-diamines for forming an aqueous solution. The water added is an amount sufficient to give a water to diacid salt ratio in the range of about 0.5 to 10 by weight with a preferred ratio in the range of 1.0 to 3.0.

The mixture is preferably substantially completely dissolved in water. If this substantial dissolving does not occur at about room temperature, then it is preferred that the mixture in water be heated until the mixture is substantially completely dissolved and an aqueous solution is formed. The precipitate can then be formed and separated from the solution.

It is preferred that the aqueous solution be heated to temperatures in the range of about 140° F. to about 212° F. and thereafter cooled to temperatures in the range of about 0 to about 72° F. for forming the precipitate. More particularly, the aqueous solution is preferably heated to about 100° C. and the cooling thereof being conducted at about 72° F. and atmospheric pressure.

In the preparation of the diacid salts of the diamines, the cis- and trans-diamines will react with a diacid to form a solution of diacid salts over a period of time at about 72° F. and about atmospheric pressure, but by increasing the temperature of the aqueous slurry of diamine and diacid to a value in the range of about 140° F. to about 212° F., the reaction time required for forming the diacid salts of the diamines is decreased to a practical length of time for commercial operations and the salt-forming reaction proceeds more nearly to completion. After the precipitate has been separated from the solution, the diacid salts and each of the fractions can be converted to the amine by reaction with a suitable base. Suitable bases that can be used are alkali metal hydroxides or alkaline earth metal hydroxides. These bases may be utilized in aqueous or alcoholic solutions. The diacid salts in each fraction are thus converted to a cis- and trans-diamine mixture one of which is enriched in the trans-isomer content, while the other is enriched in the cis-isomer content when compared to the original mixture.

Separation of the precipitate and the aqueous solution can be effected for example by gravity filtration, centrifugation, and suction filtration. Heating and cooling of the aqueous solution can be effected for example by various means known in the art such as by steam, electricity, or hot circulating baths and by cold circulating fluids, and cooling at about 72° F. and about atmospheric pressure in an insulated container.

The following are examples of the method of this invention.

EXAMPLE I

A 740.7 g. (5.0 moles) sample of adipic acid was weighed into a one gallon plastic bottle and about 900 g. of boiling water was added. A 711.25 g. (5.0 moles) sample of 1,4-bis(aminomethyl)cyclohexane (bAMCH, 49.3 percent trans, 50.7% cis) was then added in portions to the aqueous acid mixture, and the heat of reaction was dissipated by placing the plastic bottle in cold water and swirling. A pale yellow solution resulted and, on standing at room temperature, a white crystalline precipitate began to form. This precipitate did not appear to dissolve on warming the mixture in a 60° C. warm water bath. The mixture was chilled in an ice bath and the white precipitate removed by filtration. After air-drying, the adipic acid salt of bAMCH precipitate weighed 490 g. which represents a 34 percent yield of salt based on charged adipic acid and bAMCH.

A 28.8 g. sample of the adipic acid salt of bAMCH was treated with 125 ml. of 2 M methanolic sodium hydroxide solution. The mixture was stirred by a magnetic bar and refluxed for a short period on a hot plate and then allowed to stand at room temperature overnight. The mixture was filtered, and the filtrate was concentrated to 29.6 g. A gas chromatographic analysis of the filtrate showed that the amine mixture contained 73.5 mole percent trans - 1,4 - bis(aminomethyl)cyclohexane and 26.5 mole percent cis-1,4-bis(aminomethyl)cyclohexane.

Example I shows that from an original sample of bAMCH containing 49.3 weight percent trans-isomer, a fraction containing 73.5 weight percent trans-isomer was separated by the process of the instant invention.

EXAMPLE II

A 355.6 g. (2.5 moles) sample of 1,4-bis(aminomethyl)cyclohexane was weighed into a 2-liter Erlenmeyer flask containing 791 ml. deionized water and equipped with a magnetic stirring bar. A 435.5 g. (2.5 moles) sample of suberic acid (1,8-octanedioic acid) was added in small portions to the stirred aqueous mixture, and the mixture was divided into two 2-liter Erlenmeyer flasks before heating to complete solution of the acid. Both flasks were cooled to room temperature and allowed to stand 3 days. The thick syrupy mixtures froze solid on cooling in an ice bath. The contents of flask No. 1 were warmed to room temperature and allowed to stand for a period of 48 hours before filtering to remove 263.3 g. (33.2 percent yield) of the suberic acid salt of bAMCH. Flask No. 2 was chilled in an ice bath for 5 hours before filtering off 356.2 g. (45 percent yield) of the suberic acid salt of 1,4 - bis(aminomethyl)cyclohexane. The suberic acid salts of bAMCH from flasks No. 1 and No. 2 were treated with aqueous sodium hydroxide to free the diamine which was analyzed by gas chromatography. The diamine from flask No. 1 contained 77.9 percent trans- and 22.1 percent cis- whereas the diamine from flask No. 2 contained 88.1 percent trans- and 11.9 percent cis-. The starting diamine contained 58 percent trans- and 42 percent cis-isomers.

EXAMPLE III

A 142.2 g. (1.0 mole) sample of 1,4-bis(aminomethyl)cyclohexane was dissolved in 372 g. water contained in a 2-liter Erlenmeyer flask. In a separate 2-liter Erlenmeyer flask, a 230.1 g. (1.0 mole) sample of 1,12-dodecanedioic acid was slurried with 372 g. of boiling water, and the bAMCH solution was added to the aqueous acid slurry. A final 372 g. portion of water was added, and the mixture was boiled to effect complete solution. The flask was wrapped in towels so that the solution cooled slowly to room temperature. The salt which separated during the cooling was removed by filtration and dried to a weight of 218.3 g. (58.6 percent yield). The 1,12-dodecanedioic acid salt of bAMCH was treated with aqueous sodium hydroxide to free the diamine which was analyzed by gas chromatography. The diamine contained 91.0 mole percent trans-isomer and 9.0 mole percent cis-isomer. The diamine charged initially had a trans-isomer content of 58 mole percent.

The following table summarizes the results of Examples I–III and clearly shows that the process of the instant invention can be used to adjust the ratio of cis- and trans-isomers in samples of 1,4-bis(aminomethyl)cyclohexanes.

TABLE I

|  | Mole percent trans isomer in original diamine | Mole percent trans isomer in the recovered diamine |
| --- | --- | --- |
| Example I | 49.3 | 73.5 |
| Example II | 58.0 | 77.9, 88.1 |
| Example III | 58.0 | 91.0 |

Other modifications and alterations of this invention will become apparent to those skilled in the art from the foregoing discussion and examples and it should be understood that this invention is not to be unduly limited thereto.

What is claimed is:

1. A method for separating a mixture of cis- and trans-isomers of bis(aminoalkyl)cycloalkanes into at least two fractions with at least one of said fractions having a higher content of trans-isomer than said mixture, comprising:

reacting the mixture of cis- and trans-isomers of bis(aminoalkyl)cycloalkanes with linear alpha,omega-carboxylic acid having from 5–20 carbon atoms per molecule for forming dicarboxylic acid salts of cis- and trans-isomers of bis(aminoalkyl) cycloalkanes;

adding water to form an aqueous solution having a water to diacid salt ratio in the range of about 0.5 to about 10 by weight;

forming a precipitate by lowering the temperature of the aqueous solution;

separating the precipitated fraction having a higher content of trans-isomer; and reacting the separated precipitate fraction with a base to form a diamine.

2. A method, as set forth in claim 1, including heating the aqueous solution to a temperature in the range of about 140° F. to about 212° F. and thereafter cooling the heated aqueous solution to form the precipitate.

3. A method, as set forth in claim 2, wherein the heated solution is cooled to about 72° F. at about atmospheric pressure.

4. A method, as set forth in claim 1, wherein the precipitate is separated from the aqueous solution by a process comprising filtration.

5. A method, as set forth in claim 1, wherein the first mixture of acid salts of cis- and trans-isomers of bis(aminoalkyl)cycloalkanes includes a diacid salt of trans-1,4-bis(aminomethyl)cyclohexane and cis-1,4-bis(aminomethyl)cyclohexane.

6. A method, as set forth in claim 1, wherein the mixture of acid salts of trans- and cis-isomers of bis(aminoalkyl)cycloalkanes includes a diacid salt of trans-1,4-bis(aminoethyl)cyclohexane and a diacid salt of cis-1,4-bis(aminoethyl)cyclohexane.

7. A method for separating a first aqueous solution of linear alpha,omega carboxylic acid salts having from 5–20 carbon atoms per molecule of cis- and trans-1,4-bis(aminoalkyl)cycloalkane having a water to diacid salt ratio in the range of about 0.5 to about 10 by weight, comprising:

forming a precipitate by lowering the temperature of the aqueous solution;

separating the precipitated fraction having a higher content of trans-isomers; and reacting the separated precipitate fraction with a base to form the diamine.

8. A method, as set forth in claim 7, wherein the precipitate is formed by heating the aqueous solution to a temperature in the range of about 140° F. to about 212° F. and thereafter cooling the heated aqueous solution to a temperature in the range of about 0° C. to about 72° F. for forming the precipitate.

9. A method, as set forth in claim 8, wherein the heated solution is cooled at about atmospheric pressure.

10. A method, as set forth in claim 7, wherein the precipitate is separated from the aqueous solution by a process comprising filtration.

11. A method, as set forth in claim 7, wherein the aqueous solution of diacid salts of cis- and trans-1,4-bis(aminoalkyl)cyclohexane includes diacid salts of trans-1,4-bis(aminomethyl)cyclohexane and cis - 1,4-bis(aminomethyl)cyclohexane.

12. A method, as set forth in claim 7, wherein the aqueous solution of diacid salts of cis- and trans-1,4-bis(aminoalkyl)cyclohexane includes diacid salts of trans-1,4-bis(aminoethyl)cyclohexane and cis-1,4-bis(aminoethyl)cyclohexane.

13. A method, as set forth in claim 3, wherein the precipitate is separated from the aqueous solution by a process comprising filtration.

14. A method, as set forth in claim 13, wherein the first mixture of diacid salts of cis- and trans-isomers of bis(aminoalkyl)cycloalkanes includes a diacid salt of trans-1,4-bis(aminomethyl)cyclohexane and a cis-1,4-bis(aminomethyl)cyclohexane.

15. A method, as set forth in claim 13, wherein the mixture of diacid salts of cis- and trans-isomers of bis(aminoalkyl)cycloalkanes includes a diacid salt of trans-1,4-bis(aminoethyl)cyclohexane and a diacid salt of cis-1,4-bis aminoethyl)cyclohexane.

16. A method, as set forth in claim 9, wherein the precipitate is separated from the aqueous solution by a process comprising filtration.

17. A method, as set forth in claim 16, wherein the aqueous solution of diacid salts of cis- and trans-1,4-bis(aminoalkyl)cyclohexane includes diacid salts of trans-1,4-bis(aminomethyl)cyclohexane and cis-1,4-bis(aminomethyl)cyclohexane.

18. A method, as set forth in claim 16, wherein the aqueous solution of diacid salts of cis- and trans-1,4-bis(aminoalkyl)cyclohexane includes diacid salts of trans-1,4-bis(aminoethyl)cyclohexane and cis-1,4-bis(aminoethyl)cyclohexane.

19. A method for separating a mixture of trans-1,4-bis(aminomethyl)cyclohexane and cis - 1,4 - bis(aminomethyl)cyclohexane into at least two fractions with at least one of said fractions having a higher content of trans-isomer than said mixture, comprising:
   reacting the mixture of cis- and trans-isomers of bis(aminoalkyl)cycloalkanes with linear alpha,omega-carboxylic acid having from 5–20 carbon atoms per molecule for forming dicarboxylic acid salts of cis- and trans-isomers of bis(aminoalkyl)cycloalkanes;
   adding water to form an aqueous solution having a water:diacid salt ratio in the range of about 0.5 to about 10 by weight;
   forming a precipitate by lowering the temperature of the aqueous solution;
   filtering the aqueous solution having the precipitate for separating the precipitate fraction; and
   reacting the separated precipitate fraction with a base to form a diamine.

20. A method as set forth in claim 19, including heating the aqueous solution to a temperature in the range of about 140° F. to about 212° F. and thereafter cooling the heated aqueous solution to form the precipitate.

21. A method, as set forth in claim 20, wherein the heated solution is cooled to about 72° F. at about atmospheric pressure.

22. A method, as set forth in claim 21, wherein the base is one of alkali metal hydroxide or alkaline earth metal hydroxide in one of aqueous or alcoholic solution.

23. A method, as set forth in claim 19, wherein the base is one of alkali metal hydroxide or alkaline earth metal hydroxide in one of aqueous or alcoholic solution.

24. A method for separating a mixture containing dicarboxylic acid salts of trans-1,4-bis(aminoethyl)cyclohexane and cis-1,4-bis(aminoethyl)cyclohexane into at least two fractions with at least one of said fractions having a higher content of trans-isomer than said mixture, comprising:
   adding water to the mixture to form an aqueous solution having a water:diacid salt ratio in the range of about 0.5 to about 10 by weight;
   forming a precipitate by lowering the temperature of the aqueous solution;
   filtering the aqueous solution having the precipitate for separating the precipitate fraction; and
   reacting the separated precipitate fraction with a base to form a diamine.

25. A method, as set forth in claim 24, including heating the aqueous solution to a temperature in the range of about 140° F. to about 212° F. and thereafter cooling the heated aqueous solution to form the precipitate.

26. A method, as set forth in claim 25, wherein the heated solution is cooled to about 72° F. at about atmospheric pressure.

27. A method, as set forth in claim 26, wherein the base is one of alkali metal hydroxide or alkaline earth metal hydroxide in one of aqueous or alcoholic solution.

28. A method, as set forth in claim 24, wherein the base is one of alkali metal hydroxide or alkaline earth metal hydroxide in one of aqueous or alcoholic solution.

References Cited
UNITED STATES PATENTS

| | | | |
|---|---|---|---|
| 3,187,045 | 6/1965 | Smith | 260—563 R |
| 3,661,982 | 5/1972 | Beswick | 260—501.2 |

LEWIS GOTTS, Primary Examiner

D. R. PHILLIPS, Assistant Examiner

U.S. Cl. X.R.

260—501.2, 404.5